United States Patent
Hill et al.

(10) Patent No.: US 8,978,047 B2
(45) Date of Patent: Mar. 10, 2015

(54) METHOD AND SYSTEM FOR INVOKING AN APPLICATION IN RESPONSE TO A TRIGGER EVENT

(75) Inventors: Seth Hill, La Mesa, CA (US); Abhishek Patil, San Diego, CA (US); Guru Balasubramanian, San Diego, CA (US); Travis Baurmann, San Diego, CA (US); Bibhudendu Mohapatra, San Diego, CA (US); Dipendu Saha, San Diego, CA (US)

(73) Assignee: Sony Corporation, Tokyo (JP)

(*) Notice: Subject to any disclaimer, the term of this patent is extended or adjusted under 35 U.S.C. 154(b) by 86 days.

(21) Appl. No.: 13/296,037

(22) Filed: Nov. 14, 2011

(65) Prior Publication Data

US 2012/0297400 A1 Nov. 22, 2012

Related U.S. Application Data (60) Provisional application No. 61/439,230, filed on Feb. 3, 2011.

(51) Int. Cl.
*G06F 9/46* (2006.01)
*G06F 9/445* (2006.01)
*G06F 17/30* (2006.01)

(52) U.S. Cl.
CPC .......... *G06F 9/445* (2013.01); *G06F 17/30855* (2013.01)
USPC .................................. 719/318; 725/9; 725/32

(58) Field of Classification Search
None
See application file for complete search history.

(56) References Cited

U.S. PATENT DOCUMENTS

| | | | |
|---|---|---|---|
| 6,667,747 B1 | 12/2003 | Spellman et al. | |
| 2002/0165932 A1 | 11/2002 | Rensin et al. | |
| 2005/0283800 A1 | 12/2005 | Ellis et al. | |
| 2007/0004451 A1* | 1/2007 | C. Anderson | 455/556.1 |
| 2007/0070240 A1* | 3/2007 | Oya | 348/375 |
| 2008/0046919 A1* | 2/2008 | Carmi et al. | 725/32 |
| 2008/0268876 A1* | 10/2008 | Gelfand et al. | 455/457 |
| 2010/0056272 A1* | 3/2010 | Dutilly et al. | 463/30 |
| 2010/0138515 A1 | 6/2010 | Ruiz-Velasco et al. | |
| 2010/0138680 A1* | 6/2010 | Brisebois et al. | 713/324 |
| 2010/0318535 A1* | 12/2010 | Weber et al. | 707/759 |
| 2011/0181526 A1* | 7/2011 | Shaffer et al. | 345/173 |
| 2011/0238690 A1* | 9/2011 | Arrasvuori et al. | 707/769 |
| 2011/0320482 A1* | 12/2011 | Barbieri et al. | 707/769 |
| 2012/0050183 A1* | 3/2012 | Lee | 345/173 |

OTHER PUBLICATIONS

Yahoo!; "Yahoo! Widgets, What's in the Dock Settings Menu?", published at http://help.yahoo.com/l/us/yahoo/widgets/using/using-08.html; Oct. 6, 2008, Yahoo! Inc.

\* cited by examiner

*Primary Examiner* — H S Sough
*Assistant Examiner* — Umut Onat
(74) *Attorney, Agent, or Firm* — Fitch, Even, Tabin & Flannery LLP

(57) ABSTRACT

A method for invoking a software application comprising: executing a first application on a user device; detecting a trigger event on the user device, the trigger event is non-specific and external to the first application and a second application; invoking the second application in response to the trigger event; sending metadata from the first application to the second application; and performing an action in the second application based at least partially on the metadata received from the first application, wherein, the first application and the second application are not operating system processes, and the second application is separate and independent from the first application.

18 Claims, 6 Drawing Sheets

METHOD AND SYSTEM FOR INVOKING AN APPLICATION IN RESPONSE TO A TRIGGER EVENT

This application claims the benefit of U.S. Provisional Application No. 61/439,230, filed Feb. 3, 2011, which is incorporated in its entirety herein by reference.

BACKGROUND OF THE INVENTION

1. Field of the Invention

The present invention relates generally to methods and systems for facilitating communication between multiple software applications, and more specifically to methods and systems for utilizing metadata from one software application in another software application in response to a trigger event.

2. Discussion of the Related Art

User electronic devices such as smartphones, tablet computers, netbook computers, and smart TVs are increasingly being used for a wide range for purposes. Conventionally, the applications naming on these devices are controlled by command inputs performed within the application or directed at the application. For example, a user typically touches or clicks on part of the application display to cause the application to perform an action. Such command inputs are performed within the interface provided by the application, and the action performed is often also internal to the application.

SUMMARY OF THE INVENTION

Several embodiments of the invention advantageously address the needs above as well as other needs by providing a method and device for utilizing metadata from one application in another application in response to a trigger event.

In one embodiment, the invention can be characterized as a method for invoking a software application comprising: executing a first application on a user device; detecting a trigger event on the user device, the trigger event is non-specific and external to the first application and a second application; invoking the second application in response to the trigger event; sending metadata from the first application to the second application; and performing an action in the second application based at least partially on the metadata received from the first application, wherein, the first application and the second application are not operating system processes, and the second application is separate and independent from the first application.

In another embodiment, the invention can be characterized as a user device for running multiple software applications comprising: a processor, a trigger sensor, and a memory, wherein, upon execution of a executable program instructions by the processor, the user device is configured to: run a first application, receive a trigger signal from the trigger sensor, the trigger sensor sensing a trigger that is non-specific and external to the first application; invoke a second application stored on the memory in response to the trigger signal; transfer metadata from the first application to the second application; and performing an action in the second application based at least partially on the metadata, wherein, the first application and the second application are not operating system processes, and the second application is separate and independent from the first application.

In a further embodiment, the invention may be characterized as a method for running multiple software applications with an application manager, the method comprising: detecting a trigger event on a user device, the trigger event being non-specific and external to each one of one or inure other applications running on the device; identifying one of the one or more other applications running on the device to be a first application recognized by the application manager; causing metadata to be transferred between the first application and a second application; and causing the second application to perform an action based at least partially on metadata from the first application, wherein, the first application and the second application are not operating system processes, and the first application, the second application, and the application manager are each separate processes.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
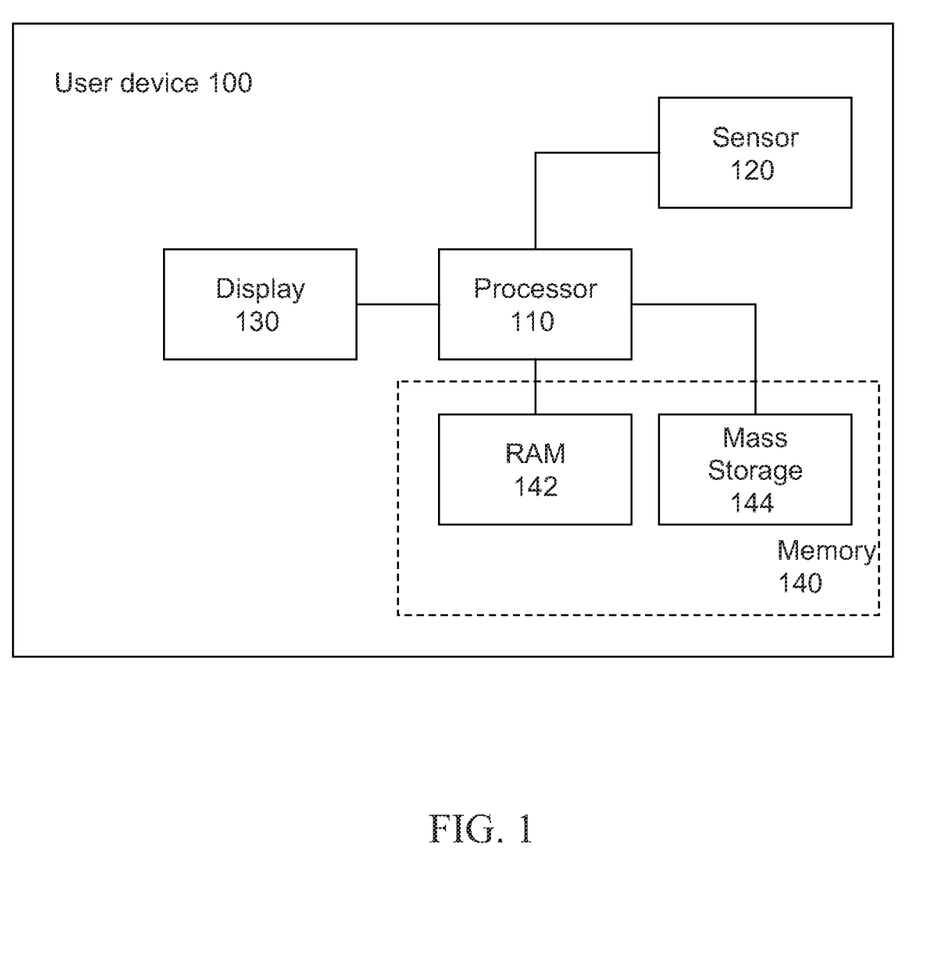
FIG. 1 is a block diagram of a user device for running multiple applications in response to a trigger signal, according to one or more embodiments.

Referring first to FIG. 1, a user device is shown, generally designated 100, which includes a processor 110 (such as a Central Processing Unit (CPU)), a sensor 120, a display 130, and a memory 140 which includes a RAM 142 and a mass storage 144. The user device may be a user electronics device capable executing multiple applications such as a tablet computer, a notebook computer, a netbook computer, a smartphone, a smart television, a portable media player, a portable game console, or other multimedia computer or server. Further, in some embodiments, the applications can include applications that are commonly referred to as "apps," which are often run on portable media devices such as tablets (e.g., IPADS) and smart phones (e.g., ANDRIOD, IPHONE, etc.). Currently, however, ANDROID applications run in a sandbox, an isolated area of the operating system that does not have access to the rest of the system's resources, unless access permissions are granted by the user when the application is installed.

The processor 110 of the user device 100 is communicatively connected to the sensor 120. In some embodiments, the sensor may be a connectivity sensor, a microphone, a video camera, a motion sensor, a touch pad, a touch screen, an accelerometer, etc. In some embodiments, when a specified trigger event is detected on the sensor 120, a trigger signal is sent to the processor 110 to notify the processor of the trigger event. The trigger event may be an action or an occurrence that is not performed in or directed at an active application displayed on the display screen. In some embodiments, the sensor is further able to detect a reverse trigger event. The processor 110 is coupled with memory 140 and adapted for executing multiple program instructions stored in the memory 140. The memory 140 stores executable program instructions that are selectively retrieved and executed by the processor 110. The processor outputs a display signal to the display 130. The display 130 is adapted to display image outputs of applications that are executed by the processor 110. While the display 130 is shown as part of the user device 100 in FIG. 1, in some embodiments, the display 130 may be external to the user device and connected to the a media output port of the user device 100. While in FIG. 7, the sensor 120 and the display 130 are shown as separate blocks, in some embodiments, the sensor 120 and the display 130 may be combined as a touch screen.

In one embodiment, the user device 100 executes a first application and monitors for a trigger signal, which is generated by the sensor 120 when a trigger event is detected. The sensor 120 may be adapted to detect trigger events such as connection or disconnection of the device 100 to a external source, docking and undocking of the device 100, e.g., connecting and disconnecting the device 100 from a cradle or a cable with a suitable connector that provides a suitable connection to a media source (such connector may include a mechanical connector, an electrical connector, an optical coupling, an inductive coupling, or a capacitive coupling, or any such suitable connector or coupling), gesture on a touch screen such as a pinch gesture, a specific tag in a media stream input, a free-space movement of a user, a voice command, a sound, a movement or change in orientation of the user device, etc. When a trigger signal is received, the processor 110 invokes a second application stored in the memory 140. In some embodiments, when the second application is invoked, the processor 110 causes the display 130 to display both the first application and the second application on the same screen. In some embodiments, the first and the second applications are displayed together in split screen (side-by-side) mode or picture-in-picture mode and the user is able to use both applications displayed on the screen. In some embodiments, the second application may be running when the trigger signal is received. If the second application is running, the processor 110 may cause an action to be performed in the running instance of the second application or may start another instance of the second application to perform the action.

The processor 110 executing instructions stored in the memory 140 transfers metadata between the first and the second application. In some embodiments, metadata is transferred once from the first application to the second application in response to a trigger event detected at the sensor 120. In some embodiments, the transfer for metadata is continuous until it is terminated. The termination of transfer of metadata may be caused by a reverse trigger event sensed by the sensor 120, or by the termination of either the first application or the second application. In some embodiments, the reverse trigger event may be detected by a different sensor. In some embodiments, when the sensor 120 detects a reverse trigger event, the processor 110 process may terminate, pause, or minimized the second application, or send the second application to the background of the display 130. In some embodiments, the metadata transferred from the first application to the second application may contain information regarding a state of the first application when the trigger signal is received. The processor 110 executing instructions stored in the memory 140 further causes the second application to utilize the metadata from the first application to perform an action in the second application. In some embodiments, metadata from the second application may also be used to cause the first application to perform an action.

Figure 2:
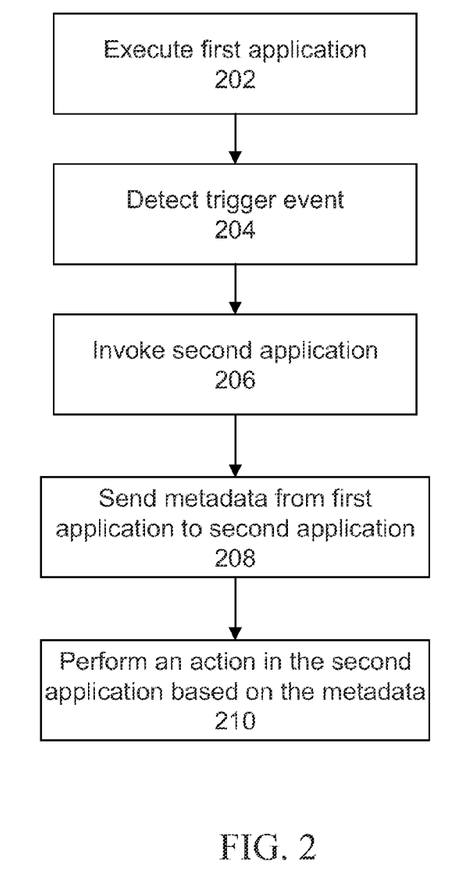
FIG. 2 is a flow diagram of a process of invoking a software application in response to a trigger event, according to one or more embodiments.

Referring next to FIG. 2, a flow diagram of a process for invoking a second application in response to a trigger event is illustrated. First, in step 202, a first application is executed on a device. In step 204, the device detects a trigger event. The trigger event may be an occurrence that is not performed in or directed at the first application, and is external and non-specific to the first application. In some embodiments, a trigger event may be one of: a connecting or disconnecting of a physical connection, a free-space movement, a voice command, a sound, a movement or change in orientation of the user device, a gesture on a touch screen such as a pinch gesture, a specific tag in a media stream input, etc. In step 206, the second application is invoked. In some embodiments, the first and second applications may be a media viewer, a web browser, an application for performing a internet search, an application for streaming media from a remote server, an application for accessing social media service, an application for accessing an online retail service, an application for accessing database located on a local drive or on a remote server, etc. In some embodiments, the first and second applications are not part of the operating system. In some embodiments, the first and second applications are separate and independent from each other, namely, one application is not a sub-process of another. In step 208, metadata from the first application is sent to the second application. In one embodiment, the first application is a web browser, and the metadata may contain at least one oft a URL, a webpage descriptor, or part of the content of the web content being viewed. In another embodiment, the first application is a television program viewer, and the metadata may contain at least one of: the name of the TV program, the episode name, name of casts, genre of the show, show schedule, names of persons, products, or locations appearing on the screen, etc. In yet another embodiment, the first application is a media player playing a movie, and the metadata may contain at least one of: information regarding be name, genre, release year, cast, director, producer, and studio affiliation of the movie. In step 210, an action is performed in the second application based on the metadata from the first application. In some embodiments, the second application is a web browser accessing a search engine, and the second application performs a search using at least part of the content of the metadata. In some embodiments, the second application accesses a website based on the metadata, the website might be determined based on at least part of the content of the metadata. In some embodiments, the second application accesses a social networking site, and the content of the metadata is used to post an update on the social networking site. In some embodiments, the second application is a media player, and the content of the metadata is used to select a media for playback. In some embodiments, the first application is a TV viewer and the second application accesses a media streaming service. The second application uses the information provided by the metadata to play the same TV show at the playback position that the trigger event occurred. In some embodiments, the metadata contains the name of a product, and the second application accesses an online retail site for that product.

Figure 3:
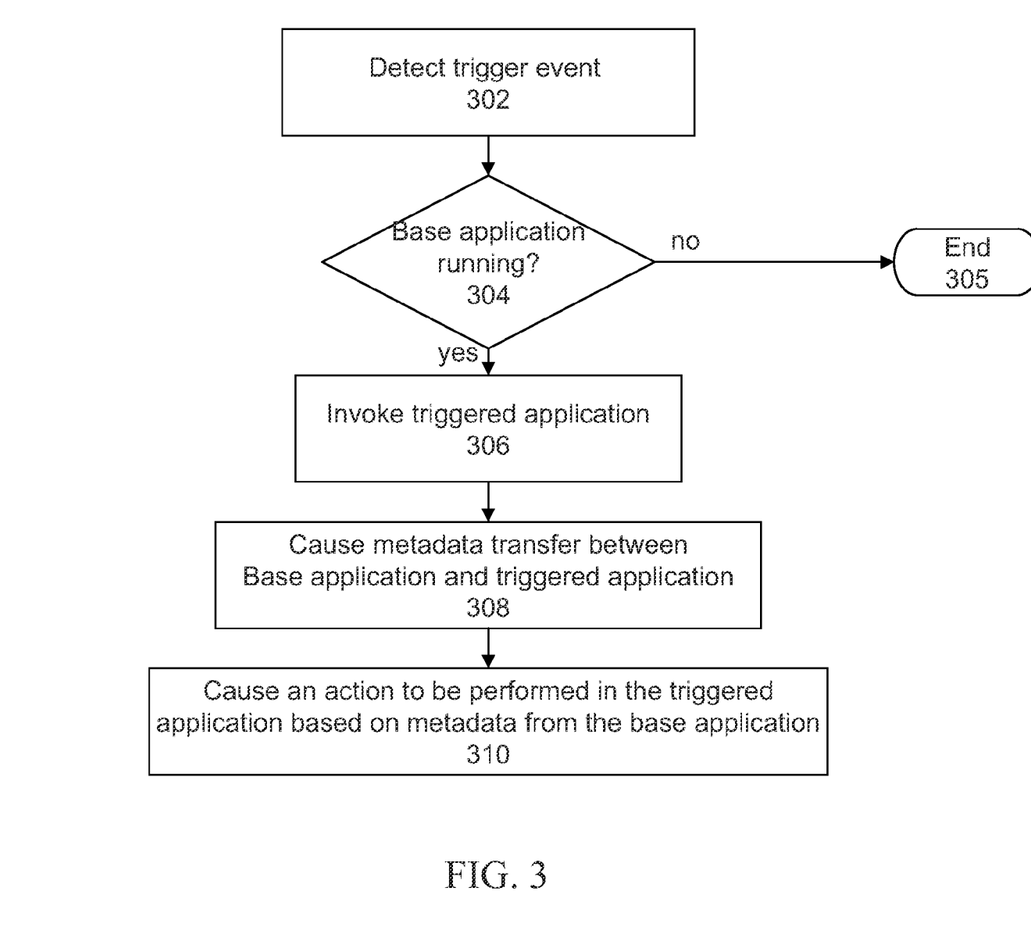
FIG. 3 is a flow diagram of a process for transferring metadata between applications through an agent process, according to one or more embodiments.

Referring next to FIG. 3, a flow diagram of a process for utilizing metadata from a base application in a triggered application through an agent process is illustrated. In some embodiments, the first application previously described may be a base application, and the second application previously described may be a triggered application. In some embodiments, the agent process may be part of the base application, part of the triggered, application, part of the operating system, a separate process automatically executed when the base or triggered application is executed, or a stand alone process that is either executed by a user or automatically executed at the start-up of a user device. In some embodiments, the agent process is independent and separate from base and triggered applications described herein. Throughout this application, the agent process is sometimes referred to as an application manager application or process. In step 302, the agent process detects a trigger event. In some embodiments, the trigger event is first received by another process, such as a hardware driver, and then detected by the agent process. In step 304, the agent process searches through the running process on the user device and determine if the base application is running. In some embodiments, the agent process only determines whether the active application (such as the application that is currently displayed on the display screen) is a recognized base application. In step 305, if no recognized application is fund in the user device's running processes, the agent process does nothing. In some embodiments, after step 305, the agent process continues to monitor the device for trigger events. In step 306, if a base application is found in the user device's running processes, the agent process invokes a triggered application. If the triggered application is already running on the user device, the agent process may cause an action to be performed in the running instance of the triggered application or may start another instance of the triggered application in which to perform the action. In step 308, the agent process causes metadata to be transferred between the base application and the triggered application. In some embodiments, the transfer is a one time transfer of metadata from the base application to the triggered application. In some embodiments, the transfer of metadata from the base application to the triggered application is continuous. In some embodiments, metadata is transferred from base application to the triggered application as well as form triggered application to the base application. In step 310, the agent process causes an action to be performed in the triggered application based on the metadata from the base application. In some embodiments, the agent process may associate the triggered application with an action. In some embodiments, the agent process may determine an action to perform in the second application based on the content of the metadata. For example, if the second application is a web browser, when the metadata contains information of a product, the agent process may cause the web browser to display an online retailer website selling that product; and when the metadata contains information of a location, the agent process may cause the web browser to display a map of that location. In some applications, the agent process displays a list of available actions to perform in the triggered application for user selection.

In some embodiments, the base and trigger application can each be one of: a media viewer, a web browser, an application for performing a internet search, an application for streaming media from a remote server, an application for accessing social media service, an application for accessing an online retail service, an application for accessing database located on a local drive or on a remote server, etc.

In some embodiments, the trigger event may be a connecting or disconnecting of a physical connection, a free-space movement, a voice command, a sound, a movement or change in orientation of the user device, a gesture on a touch screen such as a pinch gesture, a specific tag in a media stream input, etc.

In some embodiments, the agent process is able to detect more than one type of trigger event (e.g. both a pinch gesture and a disconnection), each trigger event is associated with one or more base application, each base application is associated with one or more triggered application, and each triggered application is associated with one or more available actions. In some embodiment, when the agent process detects a trigger event, the agent process may automatically select some or all of the base applications, the triggered application, and the action to be performed in the triggered application based on pre-defined settings and/or the metadata from the base application. In some embodiments, the agent process may provide a list of applications or actions for user selection when more than one option is available.

In some embodiments, the agent process may to recognize more than one application as the base application in response to each type of trigger event. For example, a disconnection event may prompt the agent process to search for a media player application and a social media application, while a pinch gesture event may prompt the agent process to search for the media player application and a web browser in the running processes. In some embodiments, applications associated with each trigger event may be prioritized, so that when more than one base applications associated with the trigger event is found the running process, the agent process is able to select one or more of the base applications based on pre-defined settings. For example, the agent process may select the active application from among the recognized applications to be the base application.

In some embodiment, each base application is associated with one or more triggered applications to be invoked. In some embodiments, the agent process is able to automatically select one of the one or more triggered applications associated with the base application based on either pre-defined settings or the content of the metadata. For example, if the base application is a media player, the agent process may invoke a movie database application when the metadata indicates that a movie is played in the media player, and invoke a merchant site when metadata indicates that a commercial is played in the media player when the trigger event occurred. In some embodiments, the agent process displays a list of triggered applications associated with the base application to a user for selection.

Figure 4:
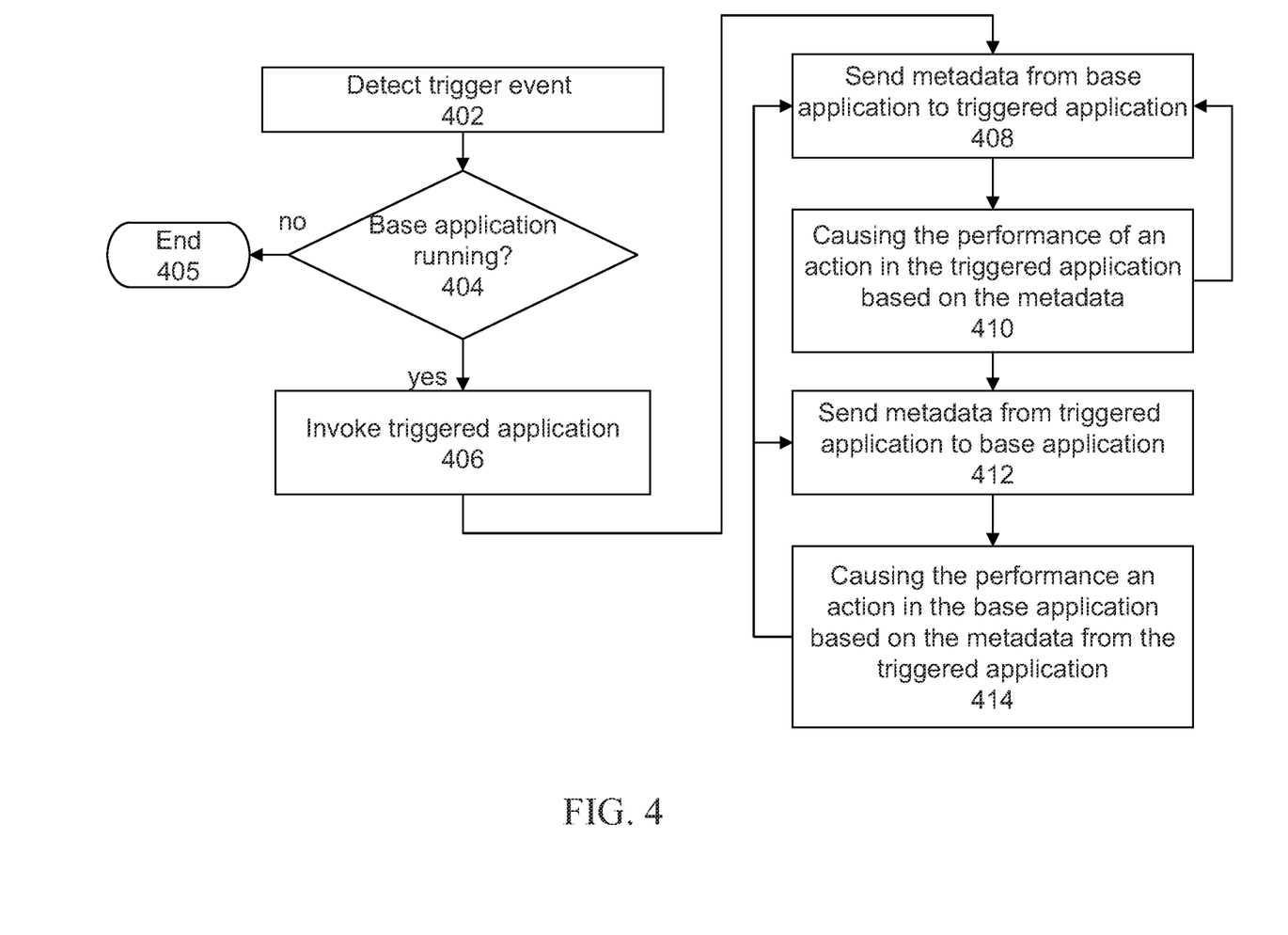
FIG. 4 is a flow diagram of a process for continuous two-way transfer of metadata between applications through an agent process, according to one or more embodiments.

Referring next to FIG. 4, a flow diagram of a process for sharing metadata between a base application and a triggered application using an agent process is illustrated. Steps 402-406 are similar to steps 302-306 described with reference to FIG. 3, and a detailed description of steps 402-406 is therefore omitted herein. In step 408, metadata from the base application is sent to the triggered application. In step 410, the agent process causes an action to be performed in the triggered application based on the metadata. After step 410, additional metadata can be sent from the base application to the triggered application (Step 408). In step 412, metadata is sent from the triggered application to the base application. In step 414, the agent process causes the performance of an action in the base application based on the metadata from the triggered application. After step 414, additional metadata can be transferred from the based application to the triggered, application (step 408) or from the triggered application to the based application (step 412).

In some embodiments, the two way transfer of metadata can continue until interrupted. In some embodiments, the transfer ends when either the base application or the triggered application is terminated. In some embodiments, the transfer ends when a reverse trigger event is detected. In some embodiments, the reverse trigger is the reversal of the trigger. For example, in some embodiments, the trigger event is the disconnecting of a physical connection, and the reverse trigger event is the reconnecting of the physical connection. In another example, the trigger event is a 90 degree clockwise rotation of the user device, and the reverse trigger event is the 90 degree counter-clockwise rotation of the user device. In some embodiments, the reverse trigger may be a second occurrence of the trigger event. For example, in some embodiments, the trigger is a pinch gesture on a touch device, and the reserve trigger is another pinch gesture. In some embodiments, the triggered event may be a pinch gesture, and the reverse trigger event may be the docking of the device. In some embodiments, the transfer of metadata between the base application and the triggered application is stored, and the stored metadata record is used to influence the actions performed in the base or the triggered application. For example, in one embodiment, the base application is a media player and the triggered application is a web browser for suggesting other media contents for viewing. The triggered application may suggest TV shows and movies based at least partly on the stored metadata history.

Figure 5:
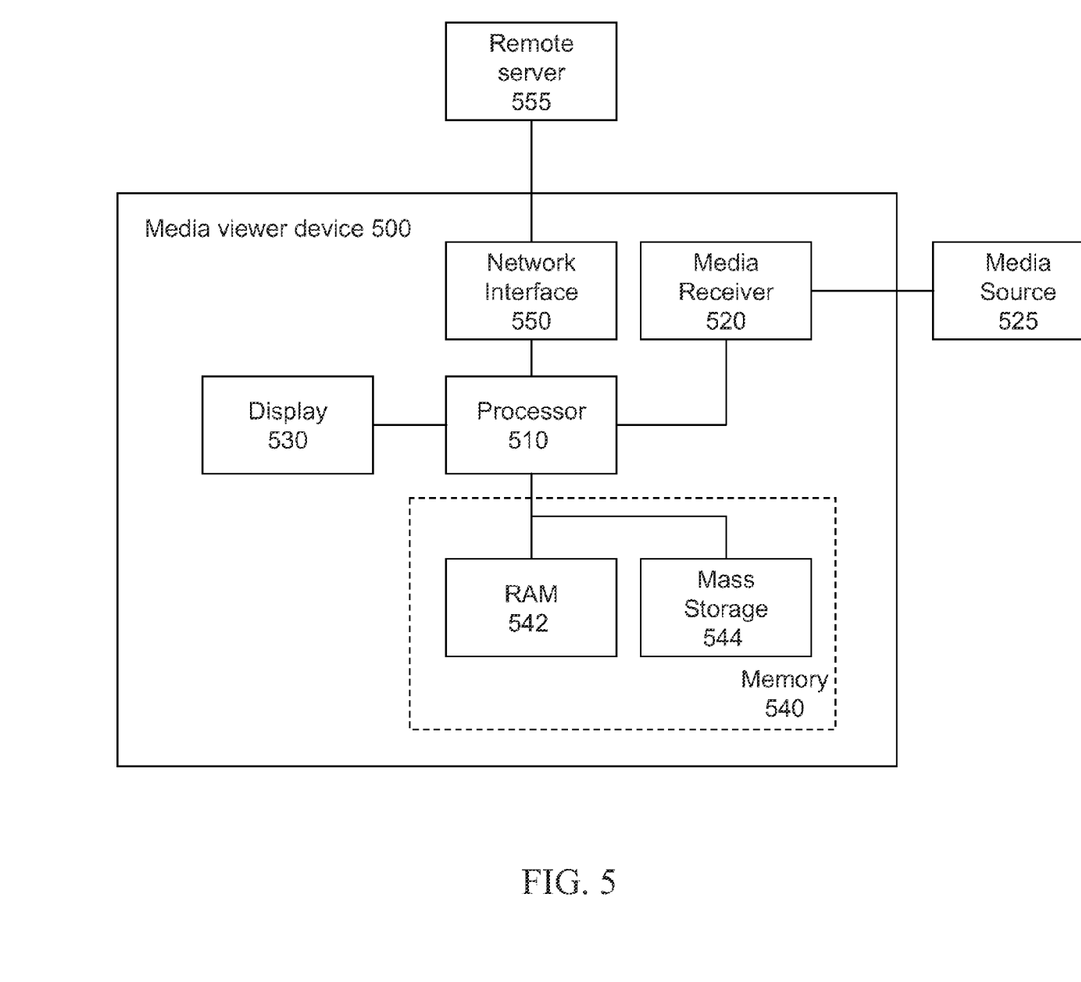
FIG. 5 is a block diagram of a media viewer device for viewing media content from a media source, according to one or more embodiments.

Referring next to FIG. 5, a media viewer device is shown, generally designated 500, which includes a processor 510, a media receiver 520 adapted to receive a media input from a media source 525, a display 530, a memory 540 comprising a RAM 542 and a mass storage 544, a network interface 550 adapted to communicate with a remote server 555. The processor 510, the display 530, and the memory 540 are similar to the processor 110, the display 130, and the memory 140 described with reference to FIG. 1, and a detailed description thereof is therefore omitted herein.

In some embodiments, the media receiver 520 is connected to the media source 525 through a physical connection. When the connection to the media source is lost, for example, through unplugging a cable or undocking the media viewer device 500 from a cradle, a trigger signal is sent to the processor 510. In some embodiments, the media source 525 may be a television cable box, a TV antenna/receiver, a DVD player, a media storage device (such as a digital video recorder (DVR) or an external hard drive), an AM/FM or satellite radio receiver, etc. In some embodiments, the media receiver may be receiving a media stream wirelessly, and a trigger signal is send to the processor when the connection to a local or networked media streaming source is lost. The network interface 550 may be used by a first and/or a second application executed on the processor 510 to retrieve information from a remote server 555. In some embodiments, an agent process as described with reference to FIG. 3 may also retrieve trigger, application, and action definitions and associations from a remote server 555 through the network interface.

In one embodiment, when the media source 525 is disconnected from the media receiver 520 while a media player application, such as a TV viewer application, is executed, the processor 510 receives a trigger signal and invokes an application capable of retrieving information from the internet, such as a web browser. The processor 510 retrieves metadata from the media player and provides some or all of the metadata to the web browser. In some embodiments, the metadata from the media player includes information about the content being played in the media player, such as program name, episode name, cast names, program schedule, names of persons or products appearing in the media, song title, etc. The web browser then performs an action based on the metadata. For example, the web browser may perform a search on a search engine using part of the metadata content. The web browser may also access a social networking website and post an update based on the metadata content. In other embodiments, the web browser may access the studio website for the program, seller website for the product related to the content, video streaming sites for streaming the same or a similar show or movie (such as Sony's Qriocity™ service), or other websites providing information relating to at least part of the content of the metadata. In some embodiments, when the media source 525 is reconnected to the media receiver 520, a reverse trigger signal is sent to the processor 510. In some embodiments, the processor may either terminate the web browser application or remove the web browser application from the display screen on the display 530 while allowing the web browser application to run in the background.

In some embodiments, the media player is able to continue to play the video using a wireless connection after the media source is discounted from the media receiver 520. In some embodiments, the media player is paused and a still image is displayed when the media source is disconnected from the media receiver. In some embodiments, the device is able to buffer a portion of the video, so that when the media source 525 is disconnected, a portion of the video is still viewable.

In some embodiments, the metadata contains an identification of the TV show or movie shown in the media player, and a playback time when the connection to the media source 525 is lost. The web browser may use the information in the metadata to stream a video from an online streaming service, the streamed video may be of the same movie or TV program, and the playback may start form the position when the connection to the media source is lost. When the media source 525 is reconnected to the media viewer device 500, the playback position at the time of reconnection may be send from the web browser to the media viewer application as metadata.

In some embodiments, when a user performs a pinch gesture on the touch screen display 530 of the media viewer device, a trigger signal is also send to the processor 510. The processor 510 may similarly invokes the web browser application in response to the pinch gesture.

In some embodiments, the media player plays a media content that is locally stored on the device. When a pinch gesture or a disconnection occurs, the processor 510 can similarly invoke the web browser application and cause the media player application and the web browser application to share the display screen.

In some embodiments, the processor 510 causes the display 530 to display the media player application in full screen prior to the trigger event, and display the media player application and the web browser in the same screen in response to the trigger event. In some embodiment, after a reverse trigger event, the media player is returned to a full screen display.

Figure 6:
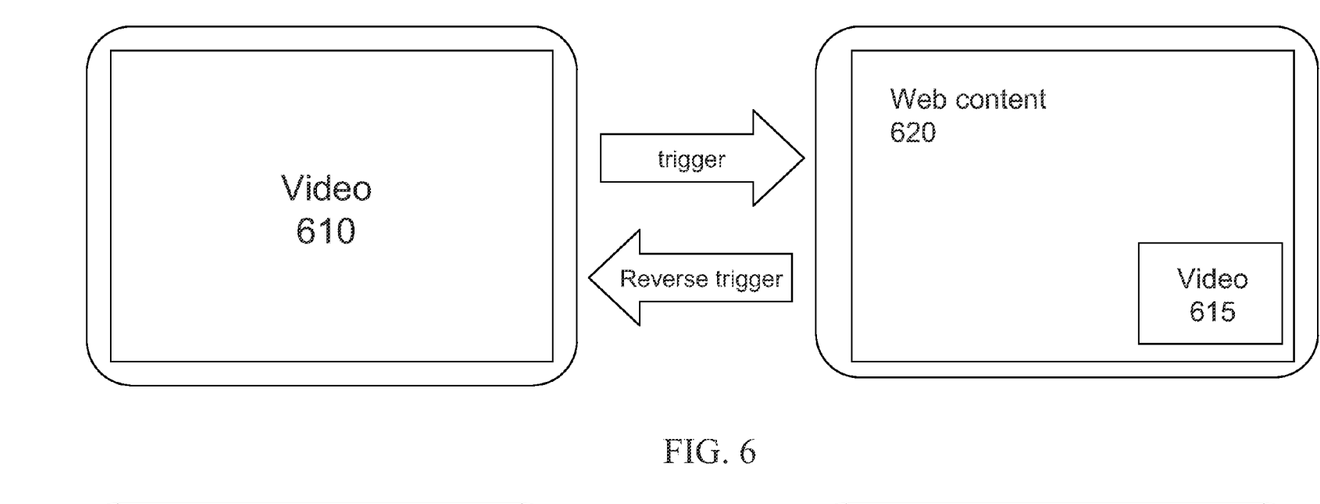
FIGS. 6 and 7 are exemplary display screen layouts of a media viewer device in response to trigger and reverse trigger events, according to one or more embodiments.
Figure 7:
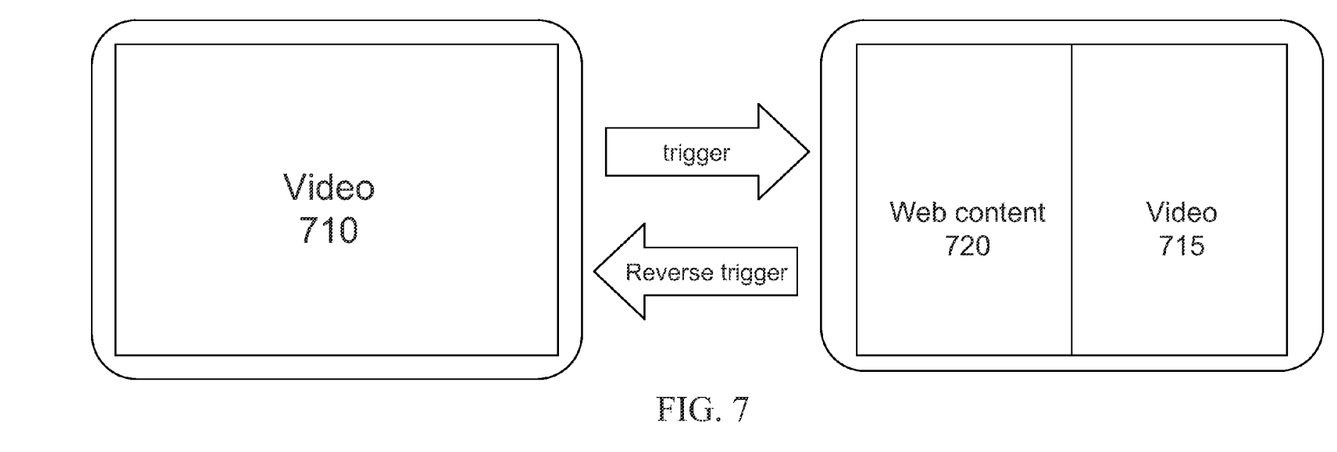

Referring next to FIGS. 6 and 7, two examples of the display screen change in response to trigger and reverse trigger events are illustrated, in FIG. 6, a video 610 is played in a media player application in full screen mode prior to a trigger event. When a trigger event occurs, the web browser application is invoked. The web content 620 retrieved by the web browser application is displayed in fall screen, and the video 615 played in the media player application is displayed in a picture-in-picture mode in one corner of the display. The placement and size of the video 615 as shown in FIG. 6 are for illustrative purpose, in some embodiments, the video can appear in other locations and sizes, in some embodiments, the user can move the locations of the box in which the video 615 is displayed. In some embodiments, the video 610 continues to play in picture-in-picture mode. In some embodiments, the video 615 pauses in picture-in-picture mode and a still image is displayed. When a reverse trigger occurs, the video 610 displayed in the media player content is returned to full screen mode. The web browser application is either closed or sent to the background.

In FIG. 7, a video 710 is played in a media player application in full screen mode prior to a trigger event. After the trigger event occurred, the web browser application is invoked, and the web content 720 retrieved by the web browser application is displayed next to the video 715 played in the media player application. This view may be referred to as duel view, split screen view, or side-by-side view. In some embodiments, the video 710 continues to play in split screen view. The placement and size of the video 715 and web content 720 as shown in FIG. 7 are for illustrative purpose, in some embodiments, the positions of the two applications may be switched, and the proportions of the screen each application occupies may differ. In some embodiments, the video 715 pauses in split screen view. When a reverse trigger occurs, the video 710 displayed in the media player content is returned to full screen mode. The web browser is either closed or pushed to the background of the display screen.

In some embodiments, portions of the videos 615 and 715 are selectable, and the selection affects the metadata sent from the media viewer application to the web browser application. For example, in some embodiments, a user may be able to select a face or a product appearing in the videos 615 and 715, and the name of the person or product would be send to the web browsers to retrieve web contents 620 and 720.

Many of the functional units described in this specification have been labeled as applications or processes, in order to more particularly emphasize their implementation independence. For example, an application or process may be implemented as a hardware circuit comprising custom VLSI circuits or gate arrays, off-the-shelf semiconductors such as logic chips, transistors, or other discrete components. An application or process may also be implemented in programmable hardware devices such as field programmable gate arrays, programmable array logic, programmable logic devices or the like.

Applications and processes may also be implemented in software for execution by various types of processors. An identified application or process of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the application or process and achieve the stated purpose for the module.

Indeed, an application or process of executable code could be a single instruction, or many instructions, and may even be distributed over several different code segments, among different programs, and across several memory devices. Similarly, operational data may be identified and illustrated herein within applications and processes, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

The invention claimed is:

1. A method for invoking a software application, the method comprising:

executing a first media player application on a user device;

receiving, by the first media player application, a media stream from a media source connected to the user device;

detecting a disconnection of the media source event on the user device while the first media player application is an active application displayed on a display screen of the user device, the disconnection of the media source event is non-specific and external to the first media player application and a second media player application;

invoking the second media player application in response to the disconnection of the media source event;

sending metadata from the first media player application to the second media player application in response to the disconnection of the media source event, the metadata comprising at least one of: program summary, cast names, and genre of the media content being played in the first media player application; and performing an action in the second media player application based at least partially on the metadata received from the first media player application, wherein, the first media player application and the second media player application are not operating system processes, and the second media player application is separate and independent from the first media player application.

2. The method of claim 1 wherein:
the metadata further comprises program name of the media content being played in the first media player application.

3. The method of claim 1 wherein,
the first media player application and the second media player application share a display screen on the user device.

4. The method of claim 1 further comprising:
performing a pinch gesture on a touch input device of the user device.

5. The method of claim 1 wherein:
the action performed in the second media player application is retrieving information from a remote server using at least part of a content of the metadata.

6. The method of claim 1 further comprising:
detecting a reverse trigger event on the user device; and
minimizing or terminating the second media player application in response to the reverse trigger event.

7. The method of claim 1 further comprising:
sending metadata from the second media player application to the first media player application; and
performing an action in the first media player application based at least partially on the metadata received from the second media player application.

8. The method of claim 1 further comprising:
causing a display device to display of a list of application for user selection; and
receiving a user application selection prior to invoking the second media player application.

9. A user device for running multiple software applications comprising:
a processor;
a trigger sensor; and
a memory;
wherein, upon execution of executable program instructions by the processor, the user device is configured to:
run a first media player application;
receive, by the first media player application, a media stream from a media source connected to the user device;
receive a disconnection of the media source signal from the trigger sensor while the first media player application is an active application displayed on a display screen of the user device, the trigger sensor sensing a disconnection of the media source that is non-specific and external to the first media player application;
invoke a second media player application stored on the memory in response to the disconnection of the media source signal;
transfer metadata from the first media player application to the second media player application in response to the disconnection of the media source signal, the metadata comprising at least one of: program summary, cast names, and genre of the media content being played in the first media player application; and
perform an action in the second media player application based at least partially on the metadata,
wherein, the first media player application and the second media player application are not operating system processes, and the second media player application is separate and independent from the first media player application.

10. The user device of claim 9 further comprising:
a network interface,
wherein the second media player application communicates with a remote server through the network interface based at least partially on the metadata.

11. The user device of claim 9 further comprising:
a port for connecting the user device to a physical connection,
wherein the trigger sensor outputs the disconnection of the media source signal when the trigger sensor detects a disconnection at the port.

12. The user device of claim 9 further comprising:
a touch input device,
wherein, the trigger sensor outputs a trigger signal when a pinch gesture is performed on the touch input device.

13. The user device of claim 9 further comprising:
the display screen,
wherein, prior to the disconnection of the media source signal, the processor causes the first media player application to be displayed on the display screen, and
after the receiving of the disconnection of the media source signal, the processor causes the first media player application and the second media player application to be both displayed on the display screen.

14. A method for running multiple software applications with an application manager on a user device, the method comprising:
receiving a media stream from a media source connected to the user device;
detecting a disconnection of the media source event on the user device, the disconnection of the media source event being non-specific and external to each one of one or more other media player applications running on the user device;
identifying one of the one or more other media player applications running on the user device to be a first media player application recognized by the application manager, wherein the first media player application is an active application displayed on a display screen of the user device;
causing metadata to be transferred between the first media player application and a second media player application in response to the disconnection of the media source event, the metadata comprising at least one of: program summary, cast names, and genre of the media content being played in the first media player application; and
causing the media player second application to perform an action based at least partially on metadata from the first media player application,
wherein the first media player application and the second media player application are not operating system processes, and the first media player application, the second media player application, and the application manager are each separate processes.

15. The method of claim 14 further comprising:
performing a look up for base applications associated with the disconnection of the media source event in response to detecting the disconnection of the media source event;
identifying the first media player application as one of the base applications associated with the disconnection of the media source event;
performing a look up for triggered applications associated with the first media player application; and
identifying the second media player application as a triggered application associated with the first media player application.

16. The method of claim 11 further comprising:
determining the action to be performed in the second media player application based on a content of the metadata from the first media player application.

17. The method of claim 14 further comprising:
causing the first media player application to perform an action based at least partially on metadata from the second media player application.

18. The method of claim 14 further comprising:
detecting a reverse trigger even on the user device; and
terminating the metadata transfer between the first media player application and the second media player application.

* * * * *

UNITED STATES PATENT AND TRADEMARK OFFICE
CERTIFICATE OF CORRECTION

PATENT NO. : 8,978,047 B2  Page 1 of 1
APPLICATION NO. : 13/296037
DATED : March 10, 2015
INVENTOR(S) : Hill et al.

It is certified that error appears in the above-identified patent and that said Letters Patent is hereby corrected as shown below:

In the CLAIMS:
Claim 14, column 12, line 48 delete "media player second application" and insert --second media player application--.
Claim 16, column 13, line 1 delete "claim 11" and insert --claim 14--.

Signed and Sealed this
Twentieth Day of October, 2015

Michelle K. Lee
*Director of the United States Patent and Trademark Office*